United States Patent [19]

Birks

[11] E Re. 31,084

[45] Reissued Nov. 23, 1982

[54] SWAGING DIES

[76] Inventor: Cedric G. Birks, 13 Northwood Park, Leeds, West Yorkshire, England

[21] Appl. No.: 35,572

[22] Filed: May 3, 1979

Related U.S. Patent Documents

Reissue of:

[64] Patent No.: 4,067,224
Issued: Jan. 10, 1978
Appl. No.: 710,815
Filed: Aug. 2, 1976

[30] Foreign Application Priority Data

Aug. 4, 1975 [GB] United Kingdom ..... 32601/75

[51] Int. Cl.[3] ..... B21J 13/02; B21D 37/10

[52] U.S. Cl. ..... 72/416; 29/517; 72/410

[58] Field of Search ..... 72/416, 412, 415, 470, 72/367, 402, 453.01, 453.15, 410, 417; 29/517

[56] References Cited

U.S. PATENT DOCUMENTS

| | | | |
|---|---|---|---|
| 2,151,032 | 3/1939 | Jensen | 29/517 |
| 2,533,943 | 12/1950 | Klein | 72/453.01 |
| 2,716,275 | 8/1955 | Matthysse | 29/517 |
| 3,731,518 | 5/1973 | Blocher | 72/402 |
| 3,771,343 | 11/1973 | Dawson | 29/237 |
| 3,823,597 | 7/1974 | Hanback | 72/402 |
| 3,835,690 | 9/1974 | Leonhardt | 72/453.15 |
| 3,848,451 | 11/1974 | Allin | 72/402 |

FOREIGN PATENT DOCUMENTS

| | | |
|---|---|---|
| 2240336 | 7/1974 | France . |
| 1432888 | 4/1976 | United Kingdom . |

*Primary Examiner*—Nicholas P. Godici
*Assistant Examiner*—Gene P. Crosby
*Attorney, Agent, or Firm*—Caesar, Rivise, Bernstein & Cohen, Ltd.

[57] ABSTRACT

Coacting swaging dies for swaging a splice sleeve onto a reinforcing bar. The dies each include a recess in their coacting surfaces. The recess in each surface includes at least two longitudinally extending ribs projecting from said recess for forming longitudinal indentations in the splice tube when said tube is squeezed between said dies. The lands between immediately adjacent ribs are concave. The ribs are so located that when the dies are in contact the recesses conjoin to form an overall polygonal shaped opening, with the ribs being equidistantly spaced thereabout.

6 Claims, 4 Drawing Figures

FIG. 1
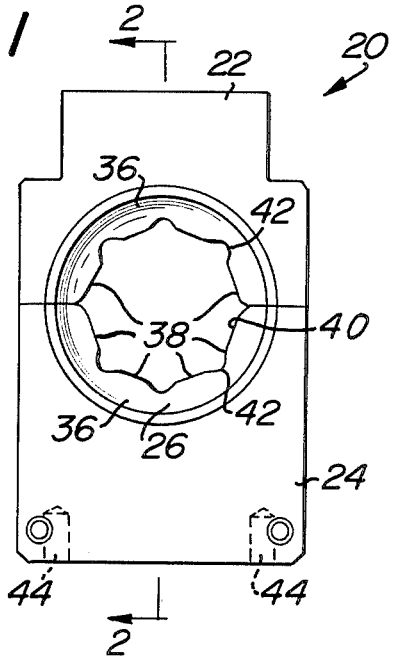
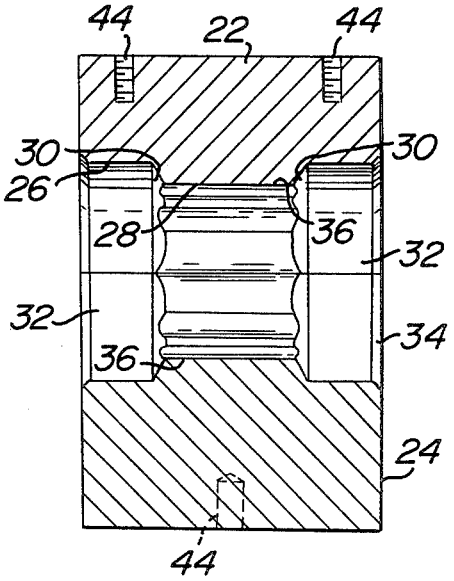
FIG. 2

SWAGING DIES

Matter enclosed in heavy brackets [ ] appears in the original patent but forms no part of this reissue specification; matter printed in italics indicates the additions made by reissue.

This invention relates generally to die parts and more particularly to die parts for use in swaging a splice sleeve onto bars or wire ropes in end-to-end or overlapping relation.

Various apparatus have been disclosed in the prior art and are commercially available incorporating a pair of dies for swaging elongated metal members such as cables or reinforcing bars in an end-to-end relation. See for example, U.S. Pat. No. 676,292 (Wigtel) and U.S. Pat. No. 2,533,943 (Klein) and British Pat. No. 1,293,954 (Zublin). Various dies of the prior art, due to their particular construction present several drawbacks. For example, due to the construction of some prior art dies the use of such dies requires at least two mutually perpendicular swaging operations or bites to effect the securement of a sleeve onto a bar. This is a time consuming and expensive operation. In addition, in some applications, e.g., wherein the members to be joined are disposed in a confined area or disposed in a closely spaced array swaging in mutually perpendicular directions may be rendered extremely difficult if not precluded by the physical space available.

Accordingly, it is a general object of this invention to provide dies for swaging sleeves on the reinforcing bars which overcomes the disadvantages of the prior art.

It is a further object of this invention to provide a pair of swaging dies which enable the maximization of swaging bite lengths while retaining the ability to operate in very confined spaces.

It is still a further object of this invention to provide a pair of swaging dies which produce an efficient distribution of swaging sleeve material during the swaging operation.

These and other objects of the instant invention are achieved by providing for use in a press for swaging a sleeve onto a bar a pair of coacting high strength metal dies. Each of said dies comprising a longitudinally extending recess having a ribbed medial portion including at least two longitudinally extending ribs projecting upward from the recess. The ribs are so located that when the dies are in contact with each other a polygonal recess is produced with the ribs of the dies equidistantly spaced about the periphery of said polygonal recess.

Other objects and many of the attendant advantages of the instant invention will be readily appreciated as the same becomes better understood by reference to the following detailed description when considered in connection with the accompanying drawing wherein:

FIG. 1 is a side elevational view of a pair of coacting swaging dies in accordance with the instant invention;

FIG. 2 is a sectional view taken along line 2—2 of FIG. 1;

Figure 3:
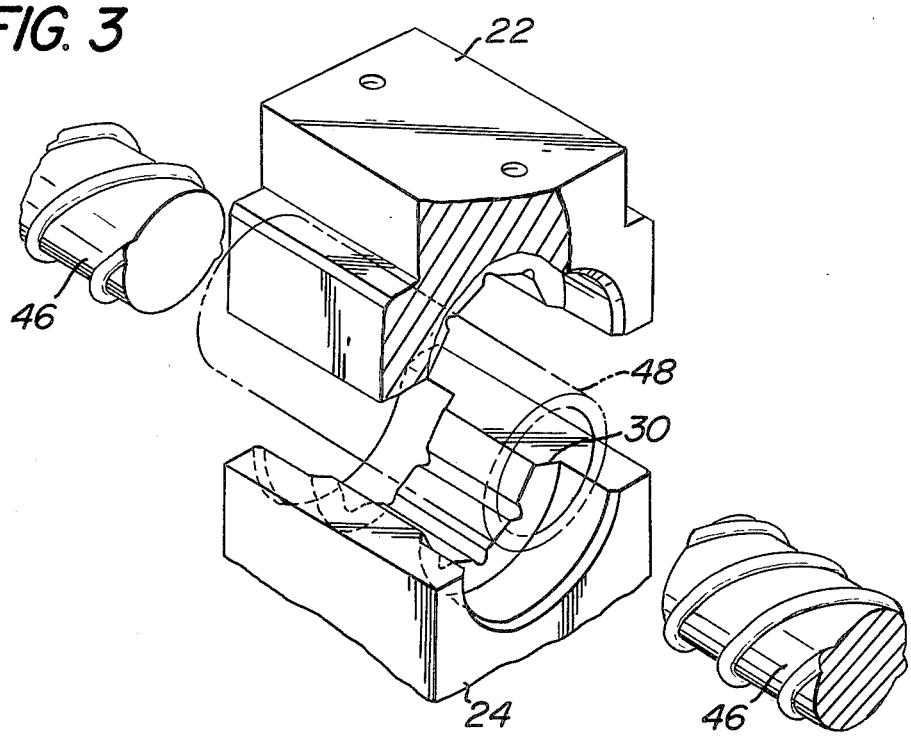
FIG. 3 is an exploded perspective view of a sleeve to be swaged onto a pair of reinforcing bars by the dies of the instant invention.

Referring now to the various figures of the drawing wherein like reference characters refer to like parts, there is shown in FIG. 1 a pair of coacting opposed metal swaging die parts 20. The pair of die parts includes an upper die part 22 and a lower die part 24. Each die part is adapted to be secured in a press, not shown. In U.S. patent application Ser. No. 710,489 filed herewith *now Patent No. 4,047,420* and whose disclosure is incorporated by reference herein, there is disclosed a press particularly suited for using the dies of the instant invention to swage a sleeve onto reinforcing bars to splice them together. The press disclosed and claimed in said application forms no part of the invention of the instant application.

As can be seen in FIGS. 1 and 3, each die part 22 and 24 has a recess 26 therein. Each recess is formed of a substantially central, generally semi-cylindrical portion 28 which communicates at each end with a semi-frusto-conical portion 30. A semi-circular cylindrical portion 32 is contiguous with and communicates with the semi-frusto-conical portion 30. The extreme ends of the cylindrical portion 32 are chamfered as at 34.

A die half 36 (FIG. 1) is constituted by the inner surface of each semi-cylindrical portion.

In accordance with a preferred embodiment of this invention each die half has plural ribs 38 (FIG. 1) extending longitudinally long the mid-portion of the recess 26. Each rib includes a generally planar top portion 40. the ribs 38 project inwardly of the recess and are so located that when the die pair 20 is in the position shown in FIG. 1 the ribs 38 in the recesses 26 are spaced equidistantly apart around the conjoined central and generally polygonal shaped opening or recess which is formed thereby. The portion 42 of the recesses 26 between immediately adjacent ribs 38 are of generally concave shape as shown clearly in FIG. 1.

As can be seen in the embodiment shown in FIG. 1 each die of the die pair includes four ribs equidistantly spaced apart so that when the dies are together the conjoined central opening formed by their recesses is of octagonal shape.

It should be pointed out at this juncture that the number of ribs in each die recess can vary, e.g., there may be two, three, four or more ribs in each die recess, but it is essential to the invention that the die opening or recess have an overall polygonal shape. It is also preferred that each die of the die pair includes the same number of ribs, although it is contemplated that the dies of the die pair 20 may be so constructed as to form an odd number of ribs when the dies of the pair abut.

In use the die parts 22 and 24 are located in a press, preferably one constructed in accordance with the teachings of the aforementioned co-pending United States patent application. That press comprises a cylinder having a longitudinal axis with a piston therein and reciprocal along the axis. The cylinder has an end and a pair of spaced arms extending from the end in a direction generally parallel to the cylinder with the distance between the outer surface of the arms measured in a direction transverse to the longitudinal axis being less than the outer diameter of the cylinder. A bridging member or cap is detachably secured to and bridges the arms. The bottom die part 24 is secured to the free end of the piston and the upper die part 22 is secured to the cap. Movement of the piston along the longitudinal axis towards the cap effects the concomitant movement of the lower die part toward the upper die part to urge the die parts together.

As shown in FIGS. 1 and 2, a plurality of screw holes 44 are provided in each of the die parts 22 and 24 for effecting the connection of the die part to the corresponding portions of the press (not shown).

Figure 4:
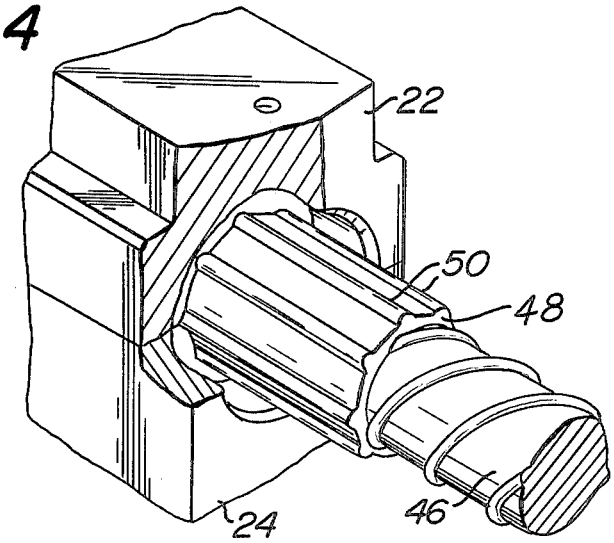
FIG. 4 is a perspective view of the dies forming a swage joint.

As shown in FIGS. 3 and 4, die parts 22 and 24 may be used to secure together two reinforcing bars 46 by means of a metal splice tube 48. To that end, one end of one reinforcing bar 46 is placed in one end of the splice tube 48 and the two parts 46 and 48 are thereafter swaged together by a force applied, via die parts 22 and 24, in a press. The second bar 46 is then located in the other end portion of the sleeve 48. The connection between the bars 46 is completed by swaging along the length of the splice tube 48 in successive swaging operations or bites. In each case the metal of the splice is deformed into tight engagement with the bar, with little or no elongation of the splice. As a consequence, the number of bites necessary to secure a splice to the bar can be reduced to a minimum.

As will be appreciated by those skilled in the art, the ribs on the dies are effective for causing equidistantly spaced indentations about the periphery in the swaged sleeve, thereby ensuring an efficient distribution of metal during the swaging operation.

The concave portions of lands 42 between adjacent ribs 38 effect the formation of a plurality of peripherally spaced longitudinally extending ribs 50 (FIG. 4) in the formed connection between bars 46.

By using the dies of the instant invention a splice sleeve can be pressed onto the reinforcing bars 46 in a single pressing direction, thereby avoiding the necessity of two mutually perpendicular swaging operations, or bites, as has characterized the use of some swaging dies. The number of bites will, of course, depend upon the sleeve length. It should be pointed out at this juncture that it is a feature of the dies of the instant invention that when they are utilized in a press constructed in accordance with the teaching of the aforenoted co-pending application, the longest possible bite length may be achieved during the splicing operation while retaining the ability to operate in very confined spaces.

In one practical example of a swage connection formed as described hereinabove the mean tensile strength achieved was 556N/mm$^2$ with little significant difference between maximum and minimum values.

Without further elaboration the foregoing will so fully illustrate my invention that others may, by applying current or future knowledge, readily adapt the same for use under various conditions of service.

What is claimed as the invention is:

1. For use in a press for swaging a sleeve onto a bar a pair of coacting high strength metal *compression* dies, each of said dies comprising a recess extending parallel to the longitudinal axis of said bar [and having a ribbed medial portion including], *said recess including a medial portion of uniform size and shape extending along its entire length, the surface of the medial portion of the recess being in the form of* a plurality of radially projecting ribs extending along said axis, said ribs projecting [upward] *radially inward* from said [recess], *surface* with the recess portions *of said recess* between immediately adjacent ribs being concavely relieved, the ribs being so located that when said dies are in contact with each other their [recesses] *medial recess portions* conjoin to form a polygonal opening *of uniform profile along its length*, with the concave relieved portions of the dies equidistantly spaced about the periphery of said polygonal opening, *said dies being arranged to be brought together in a radial direction by said press, with said sleeve and said bar disposed therebetween to compress the sleeve onto the bar* so that [upon swaging] the material of the sleeve adjacent each of said concave relieved portions conveniently flows into said relieved portions.

2. The dies of claim 1 wherein each die includes at least three longitudinally extending ribs.

3. The dies of claim 1 wherein each of said dies comprises at least four longitudinally extending ribs.

4. The dies of claim 1 wherein each of said dies include plural ribs whereupon said cylindrical opening is octagonal.

5. The dies of claim 4 wherein each recess has a semi-frusto-conical portion at either side of the ribbed portion and opening outward thereof.

6. The dies of claim 5 wherein each semi-frusto-conical portion opens into a semi-cylindrical portion, the outmost edge of which is chamfered.

* * * * *